United States Patent [19]
Baile et al.

[11] 3,812,255
[45] May 21, 1974

[54] METHODS AND COMPOSITIONS FOR IMPROVING THE FEED INTAKE OF MEAT PRODUCING ANIMALS

[75] Inventors: Clifton A. Baile, Glen Mills; Carol Lynn McLaughlin, Malvern; Robert Lee Webb, West Chester, all of Pa.

[73] Assignee: Smithkline Corporation, Philadelphia, Pa.

[22] Filed: Sept. 29, 1972

[21] Appl. No.: 293,687

[52] U.S. Cl. .............................................. 424/244
[51] Int. Cl. ............................................. A61k 27/00
[58] Field of Search ...................... 424/244; 99/2 M

[56] References Cited
UNITED STATES PATENTS 3,126,373  3/1964  Craig .............................. 424/244 X
3,517,103  6/1970  Biel ................................... 424/244
3,705,942  12/1972  Grunwaldt ......................... 424/244

*Primary Examiner*—Albert T. Meyers
*Assistant Examiner*—Frederick E. Waddell
*Attorney, Agent, or Firm*—William H. Edgerton; Richard D. Foggio

[57] ABSTRACT

New methods and compositions for inducing polyphagia in immature, meat producing animals are described utilizing certain dibenz[b,f]azepines as active ingredients. Particularly useful ingredients are 10,11-dihydro-5-H-dibenz[b,f]azepine and 5-H-dibenz[b,f]azepine.

10 Claims, No Drawings

METHODS AND COMPOSITIONS FOR IMPROVING THE FEED INTAKE OF MEAT PRODUCING ANIMALS

This invention relates to novel methods of inducing polyphagia in immature meat producing animals, such as pigs, sheep and cattle, and certain compositions useful in these new methods. More specifically, the novel methods of this invention comprise the internal preferably parenteral administration of a dibenzazepine compound to the young, preferably ruminant, animal to stimulate the animal to continue eating past its normal level of satiety thereby causing the animal to gain weight at a faster rate than that of an untreated animal. Using this invention, the meat producing animal will reach the normal market weight faster with a saving of feed, lot or pen space and labor cost. Overall, a better production efficiency and profit margin is realized by the feed lot industry by obtaining a lower feed and management cost per unit of marketable product.

Also included in this invention are compositions for administration to the growing animals which are subjects of these methods. These veterinary compositions are comprised mainly of three groups. First, the claimed compositions may be pellets which are implanted in the animal, preferably intramuscularly, thereafter allowing release of the active dibenzazepine ingredient gradually over a period of from several days up to six months for prolonged polyphagia. This form of administration is convenient because of the relatively low effective doses of certain of these active ingredients. Next, veterinary compositions comprising solutions or suspensions which can be injected into the subject animal, preferably intramuscularly. The active ingredient is present in such compositions in a quantity which is sufficient to give a positive polyphagic effect but which does not have toxic side effects or the central nervous system effects commonly associated with certain dibenzazepines.

The third category of composition is a feed composition containing an effective polyphagic but nontoxic quantity of a dibenzazepine active ingredient distributed uniformly throughout an animal feed carrier. Generally speaking the dose levels in feed compositions are higher on a per day basis than those administered by injection or implantation. All these compositions therefore comprise a veterinary carrier, pharmaceutical or feed stuff, combined with an effective, nontoxic quantity of a dibenzazepine dispersed therein.

The methods of this invention are carried out by administering the compositions described above to the immature meat producing animal internally as is convenient to the grower, that is by injection, implantation or orally such as by addition to feed, in effective but nontoxic quantities.

The basis of this invention is the unexpected discovery that commercially important animals, e.g., meat producing ruminants, when administered certain chemical ingredients of the dibenzazepine family, continue to eat past their usual point of satiety. The polyphagic effects realized are found at relatively low concentrations of the active ingredient compared to those dosage unit quantities which the N-substituted dibenzazepines elicit frank or general CNS pharmacological activity, e.g. ataractic, antiemetic or anticonvulsant effects in the human subjects in which they are commonly used.

More specifically the dibenzazepine compounds which are the active ingredients of the methods and compositions of this invention are illustrated by the following structural formula:

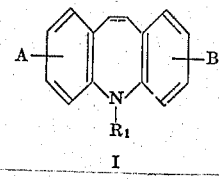

I in which A and/or B are hydrogen, halo such as chloro or bromo or another trivial substituent known to this art such as methoxy, ethoxy, trifluoromethyl, methyl, ethyl, etc.; R is hydrogen, lower acyl such as carbamyl or diloweralkylamino alkanoyl, alkyl of 1–8 carbons, diloweralkylaminopropyl or ethyl; lower alkylaminopropyl or ethyl, said lower alkyl or acyl groups having from a maximum of 8 carbons, preferably for the lower alkyl groups 1–2 carbons; and — represents an optional double bond.

The polyphagia which is the result of this invention has been found to be general for this particular class of compounds rather than specifically or critically dependent in any substituent on the dibenzazepine ring. Therefore the chemical costs of the active ingredient being critical to saving for the lot operator, the preferred compounds are those in which A, B and R are all hydrogen or an alternative inexpensive substituent.

The above compounds can be used per se or as their salts with nontoxic acids if a basic center is present. The salts are prepared by conventional methods such as reacting the base with the calculated amount of acid depending on the number of basic centers of the base in an inorganic solvent or by double decomposition of appropriate salts. Exemplary of such acids are the mineral acids such as hydrochloric, sulfuric, sulfamic, phosphoric, hydrobromic or nitric acids or the organic acids such as maleic, pamoic, methanesulfonic or the resin acids. The preferred parent compounds (R is H) do not form salts and must therefore be used in an injectable solvent such as dimethylformamide, dimethylacetamide or dimethylsulfoxide or an aqueous suspension of a finely micronized powder.

The dibenzazepines which are the active ingredients of this invention are old compounds or are easily prepared by procedures known to the art. Exemplary of these procedures are those in U.S. Pat. Nos. 2,666,051; 2,667,596; 2,762,796; 2,764,580; 2,554,736; 2,948,718; 3,062,222; 3,126,373; 3,074,931. As far as we know the only dibenzazepines of Formula I known to be of practical use in the human pharmaceutical field are the following: carbamazepine (an anticonvulsant used at 200–1,200 mg./day), desipramine (an antidepressant used at 150 mg./day) and imipramine (an antidepressant used at 50–150 mg./day). All these are listed in the Merck Index, 8th Ed. As far as we know none of these has been used chronically for veterinary purposes especially in immature meat producing animals. And we know of no prior art disclosure of the polyphagic effects of these three compounds.

We are also aware of no human or veterinary medicinal use of the parent dibenzoazepines, i.e. those in which R is hydrogen especially the preferred 5-H- dibenz[b,f]azepine and 10,11-dihydro-5-H-dibenz[b,f]azepine.

The active ingredients were tested in groups of sheep or cattle weighing 50–60 and 200–300 kg., respectively. Feed and water were available ad libitum.

A control of dimethylsulfoxide (DMS) was maintained. The procedure comprised; − 60 min. weigh feed, 0 min. inject chemical in 1.5 ml. DMS for sheep and 5.0 ml. for cattle intravenously then weigh feed, + 30 min. weigh feed, + 60 min. weigh feed and + 120 min. weigh feed.

dibenzazepine hydrochloride

The active dibenzazepine compounds of Formula I can be administered to the immature animals internally, i.e., either intramuscularly or subcutaneously in the form of sterile veterinary solutions, suspensions or pellet implants for injection or orally or dispersed throughout conventional animal feed compositions. The feed compositions are fed to immature preferably ruminant animals such as sheep or cattle, according to methods well-known to the agricultural art. The compounds may be advantageous when incorporated into

FEED INTAKES OF SHEEP FOLLOWING INTRAVENOUS INJECTIONS

| Chemical | Dose | | n sheep | 30 min | Cumulative Intake (g) 60 min | 120 min | Control Code |
|---|---|---|---|---|---|---|---|
| A | 20 | mg | 8 | 89 ± 19* | 102 ± 17* | 106 ± 16* | A |
| | 40 | mg | 8 | 92 ± 15** | 107 ± 14* | 121 ± 16* | do. |
| | 80 | mg | 8 | 90 ± 18** | 105 ± 25* | 111 ± 25 | do. |
| B | 20 | mg | 8 | 77 ± 16* | 79 ± 16 | 81 ± 16 | A |
| | 40 | mg | 7 | 111 ± 12** | 122 ± 9.9** | 130 ± 13** | do. |
| | 80 | mg | 8 | 112 ± 20** | 131 ± 26** | 138 ± 24** | do. |
| | 120 | mg | 7 | 129 ± 15** | 141 ± 17** | 142 ± 17** | do. |
| C | 16 | mg | 8 | 95 ± 21** | 99 ± 24* | 113 ± 27 | A |
| D | 10 | mg | 8 | 88 ± 18* | 93 ± 16* | 113 ± 15* | A |
| | 20 | mg | 7 | 105 ± 16** | 112 ± 16** | 117 ± 18* | do. |
| | 40 | mg | 8 | 110 ± 20** | 122 ± 22** | 124 ± 22* | do. |
| E | 40 | mg | 8 | 105 ± 10** | 129 ± 15** | 145 ± 14** | A |
| | 80 | mg | 8 | 64 ± 41 | 78 ± 46 | 139 ± 54 | do. |
| F | 97 | μg | 8 | 64 ± 26 | 69 ± 25 | 85 ± 29 | A |
| | 155 | μg | 8 | 41 ± 12 | 42 ± 12 | 67 ± 24 | do. |
| | 310 | μg | 8 | 78 ± 13* | 80 ± 13 | 93 ± 13 | do. |
| | 620 | μg | 8 | 57 ± 17 | 59 ± 17 | 66 ± 17 | do. |
| | 1.25 | mg | 8 | 54 ± 15 | 63 ± 14 | 85 ± 12 | do. |
| | 5.0 | mg | 8 | 43 ± 11 | 43 ± 11 | 43 ± 11* | do. |
| | 20 | mg | 8 | 6.3 ± 2.9* | 6.3 ± 2.9* | 23 ± 6.0* | do. |
| G | 155 | μg | 8 | 36 ± 11 | 63 ± 13 | 88 ± 17 | B |
| | 310 | μg | 8 | 71 ± 14 | 79 ± 13 | 112 ± 16 | do. |
| | 620 | μg | 8 | 46 ± 12 | 49 ± 14 | 51 ± 15 | do. |
| H | 310 | μg | 8 | 49 ± 13 | 50 ± 13 | 64 ± 15 | B |
| | 620 | μg | 8 | 70 ± 9.7 | 95 ± 17* | 122 ± 20* | do. |
| | 1.24 | mg | 8 | 66 ± 14* | 70 ± 14 | 74 ± 13 | do. |
| Control | | | 21 | 43 ± 12 | 53 ± 14 | 69 ± 17 | A |
| | | | 24 | 47 ± 9.7 | 62 ± 6.3 | 84 ± 8.2 | B |

*The asterisks denote particularly significant figures over the coded controls.

FEED INTAKES OF CATTLE FOLLOWING INTRAVENOUS INJECTIONS

| Chemical | Dose | n cattle | 30 min | Cumulative Intake (kg) 60 min | 120 min | Control Code |
|---|---|---|---|---|---|---|
| A | 50 mg | 7 | .03 + .01 | .26 + .09 | .35 + .10 | A |
| | 100 mg | 7 | .21 + 07* | .75 + .12** | 1.36 + .20** | B |
| | 200 mg | 8 | .03 + .01 | .06 + .02 | .25 + .05 | A |
| B | 100 mg | 7 | .13 + .08 | .41 + .17 | 1.06 + .27* | B |
| D | 100 mg | 8 | .07 + .02 | .37 + .09* | .67 + .15** | A |
| Control | | 32 | .07 + .02 | .16 + .03 | .32 + .04 | A |
| | | 31 | .06 + .02 | .18 + .05 | .46 + .10 | B |

A — 10,11-dihydro-5-H-dibenz[b,f]azepine
B — 5-H-dibenz-5-H-dibenz[b,f]azepine
C — 5-carbamyldibenzazepine (carbamazepine)
D — 5-(3-dimethylaminopropyl)-10,11-dihydrodibenzazepine hydrochloride (imipramine)
E — 5-(3-dimethylaminopropyl)-dibenzazepine
F — 5-(3-methylaminopropyl)-10,11-dihydrodibenzazepine hydrochloride (desipramine)
G — 5-(3-methylaminopropyl)-dibenzazepine hydrochloride
H — 3-chloro-5-(3-methylaminopropyl)- implants. The amount of the active ingredient in the compositions will be a quantity of the dibenzazepine sufficient to induce polyphagia in the satiated immature animal but not be overtly toxic or pharmacodynamic in the animal.

The animal feeds most generally used in conjunction with the method of this invention are either various grain mixtures and/or roughage feeds such as hay commonly fed to growing ruminant animals such as cattle or sheep. The amount of additive used to supplement such feeds will be in an amount sufficient to increase feed intake and/or improve the feed efficiency of the animal but not to have a toxic or noxious effect; in the broad range of from about 10 mg. to about 2,000 g. per ton of feed, preferably from about 1 to about 200 g. per ton. An average sheep will ingest about 3-4 lbs. of feed daily; an average feed lot steer about 20-25 lbs. The preferable broad range of dosage for ruminants by parenteral administration is approximately 10 $\mu$g. to 20 g. per day preferably about 1 mg. to 2 g. The compositions will therefore contain multiples of this figure depending on the number of days of duration of activity which are desired.

Generally the methods of this invention using parenteral administration comprise injecting, subcutaneously, intramuscularly or intravenously, a polyphagic but nontoxic amount of the active ingredient such as the daily dosage quantities mentioned above which are based on the activity of the most preferred compounds. Administration may be usually at most once a day but may be varied as polyphagia is desired. Usually the treatment may take place every several days, weeks or even months. The implant forms of the invention might be used only one to three or four times in the growing time of the animal. One implant is preferable. They might be administered in the ear or hind quarter of the animal.

For commercial use, the active ingredients when used in the feed can be readily used as premix formulations in which the chemical is distributed uniformly throughout a standard animal feed carrier. This premix or concentrate is then mixed with a normal diet for the animal desired. Examples of such carriers are soybean meal, corn oil, ground corn, barley, wheat, corn gluten meal, corn distillers solubles, soyflour mineral mixtures such as vermiculite and diatomaceous earth. The active ingredient will be in amounts to satisfy the criteria set forth above for whole feed. The active ingredient will usually be present in from about 1-75% by weight of the premix composition.

The animal feeds themselves may also contain: roughages such as cellulose, hay, straw, silages, corn stalks, cotton seed hulls, oats, barley and cereal brans; natural oils such as animal fats, fish oils, safflower oil, peanut oil, and cottonseed oil; antioxidants, minerals, vitamines, antibiotics, anthelmintics; and other appropriate medicaments.

Examples of typical prepared animal feed is as follows:

EXAMPLE 1

| Ingredients | Weight per cent |
|---|---|
| Mixed hay | 40.0 |
| Ground yellow corn | 45.0 |
| Soybean oil meal | 7.0 |
| Cane molasses | 7.0 |
| Decalcium phosphate | 0.5 |
| Trace minerals salt | .5 |
| Vitamin A | 300 I.U./lb. |
| Vitamin D | 150 I.U./lb. |
| Dibenzazepine | 10 mg./lb. |

The method of this invention using feed compositions comprises allowing the growing animal to graze or be fed ad libitum on the supplemented rations or to be fed on a regular schedule.

EXAMPLE 2

| Ingredients | Weight per cent |
|---|---|
| Dihydrodibenzazepine | 50 mg. |
| Calcium sulfate, dihydrate | 20 mg. |
| Gelatin | 4 mg. |
| Magnesium stearate | 1 mg. |
| Talc | 2 mg. |

The dihydrodibenzazepine and calcium sulfate, dihydrate are mixed and passed through a No. 40 standard mesh screen. The screened mixture is then granulated with hot 15% gelatin solution, screened through a No. 10 mesh screen and dried overnight at 120° F. The granules are again screened through a No. 40 mesh screen and mixed with the magnesium stearate and talc. The granules are compressed into implants using a ⅛ inch flat face punch and die. One implant is administered intramuscularly. Other standard methods of preparing and using implants are described in U.S. Pat. No. 3,428,729 and the references contained therein as well as in *J. Animal Science*, 27, 1772 (1968) or *J. Biomed. Mater. Res.*, 1, 433 (1967).

What we claim is:

1. The method of inducing polyphagia in immature, meat producing animals selected from the group consisting of pigs, sheep and cattle comprising administering internally to said animals an effective polyphagia inducing amount but nontoxic quantity of a compound having the formula:

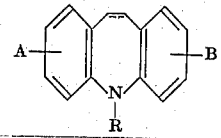

in which A and B are hydrogen, bromo, chloro, trifluoromethyl, methyl of methoxy; R is hydrogen, carbamyl, dimethylaminopropionyl, dimethylaminopropyl or methylaminopropyl; and — is an optional double bond.

2. The method of claim 1 in which the compound has the formula:

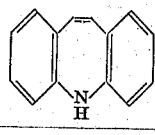

3. The method of claim 1 in which the compound has the formula:

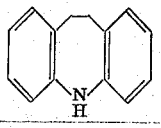

4. The method of claim 1 in which the compound is administered to a ruminant animal.

5. The method of claim 4 in which the compound is administered to the animal in the form of an implant.

6. The method of claim 4 in which the quantity of the compound is from about 1 mg. to 2 g. per day.

7. A veterinary composition having polyphagic activity comprising a veterinary carrier and as an active ingredient dispersed in said carrier a dibenzazepine compound in a quantity sufficient to induce polyphagic activity in an immature meat producing animal but not to be toxic to the animal, said compound being dibenzazepine or 10,11-dihydrodibenzazepine and said carrier being an animal feed or implant.

8. The composition of claim 7 in which the composition is in the form of a veterinary implant.

9. The composition of claim 7 in the form of a premix comprising 1–75 percent by weight of the dibenzazepine.

10. The composition of claim 7 comprising 10mg to about 2,000g per ton of animal feed.

* * * * *